United States Patent
Maiwald et al.

(10) Patent No.: US 9,463,514 B2
(45) Date of Patent: Oct. 11, 2016

(54) DEVICE FOR POSITIONING AND SUPPLYING FIXING ELEMENTS

(75) Inventors: Mario Maiwald, Creuzburg (DE); Joerg Thiem, Zella-Mehlis (DE); Gerhard Dubiel, Tambach-Dietharz (DE); Marco Mielisch, Erfurt (DE); Sebastian Zebisch, Tambach-Dietharz (DE); Marco Werkmeister, Leinatal (DE); Nico Oschmann, Friedrichroda (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 457 days.

(21) Appl. No.: 13/881,261

(22) PCT Filed: Oct. 25, 2011

(86) PCT No.: PCT/EP2011/168581
§ 371 (c)(1),
(2), (4) Date: Jun. 7, 2013

(87) PCT Pub. No.: WO2012/055830
PCT Pub. Date: May 3, 2012

(65) Prior Publication Data
US 2013/0264783 A1 Oct. 10, 2013

(30) Foreign Application Priority Data
Oct. 25, 2010 (DE) .......... 10 2010 060 141

(51) Int. Cl.
*B23B 31/12* (2006.01)
*B23K 9/20* (2006.01)
*B23P 19/00* (2006.01)
(Continued)

(52) U.S. Cl.
CPC .......... *B23B 31/02* (2013.01); *B23B 31/1261* (2013.01); *B23K 9/206* (2013.01); *B23P 19/006* (2013.01); *B25B 23/10* (2013.01); *Y10T 279/18* (2015.01)

(58) Field of Classification Search
CPC . B23B 31/1261; B23P 19/006; B25B 23/10; Y10T 279/18; B23K 9/206
See application file for complete search history.

(56) References Cited

U.S. PATENT DOCUMENTS 500,820 A * 7/1893 Saunders .............. B23B 31/023
279/106
507,315 A * 10/1893 Fitz ........................ B23B 31/18
279/106
(Continued)

FOREIGN PATENT DOCUMENTS

| CN | 101014440 A | 8/2007 |
| CN | 101108445 A | 1/2008 |

(Continued)

*Primary Examiner* — Eric A Gates
(74) *Attorney, Agent, or Firm* — Birch, Stewart, Kolasch & Birch, LLP

(57) ABSTRACT

A device for supplying and positioning fixing elements which includes, a chuck provided with two spring loaded clamping jaws that hold one fixing element therebetween for further processing, wherein the clamping jaws are operatively associated with an actuating element that extends between the clamping jaws, the actuating element being provided in an axial direction with a narrow section and two neighboring extension sections. The actuation element is connected to an axial slide for axially moving the actuation element and to open and close the chuck by forcing the camping jaws apart, releasing the fixing element for processing when the chuck is opened.

21 Claims, 4 Drawing Sheets

(51) Int. Cl.
*B23B 31/02* (2006.01)
*B25B 23/10* (2006.01)

(56) References Cited

U.S. PATENT DOCUMENTS

| | | | | |
|---|---|---|---|---|
| 669,516 | A * | 3/1901 | Field et al. | B27F 7/02 227/138 |
| 3,583,451 | A * | 6/1971 | Dixon | B23P 19/006 29/240 |
| 3,965,950 | A * | 6/1976 | MacDonald | B25B 23/10 81/455 |
| 4,454,650 | A * | 6/1984 | Silver | A41H 37/04 227/149 |
| 4,579,270 | A | 4/1986 | Matsuda | |
| 4,736,880 | A * | 4/1988 | Sodeno | B25B 23/10 227/149 |
| 4,848,638 | A * | 7/1989 | Suzuki | A41H 37/00 227/149 |
| 4,995,543 | A | 2/1991 | Earl | |
| 5,088,359 | A * | 2/1992 | Hockman | B23P 19/006 81/433 |
| 5,129,141 | A * | 7/1992 | Roberson | A47C 31/00 227/149 |
| 5,697,521 | A * | 12/1997 | Dixon | B21J 15/022 221/297 |
| 6,314,845 | B1 * | 11/2001 | Wu | B23P 19/006 81/454 |
| 6,519,836 | B2 * | 2/2003 | Watanabe | B23P 19/006 29/281.4 |
| 2008/0290615 | A1 | 11/2008 | Mauer | |
| 2015/0151392 | A1 * | 6/2015 | Chen | B23P 19/06 269/34 |

FOREIGN PATENT DOCUMENTS

| | | | |
|---|---|---|---|
| DE | 704384 C * | 3/1941 | B23P 19/006 |
| DE | 10 2004 039 398 A1 | 2/2006 | |
| GB | 379682 | 8/1932 | |
| GB | 2 138 453 A | 10/1984 | |

\* cited by examiner

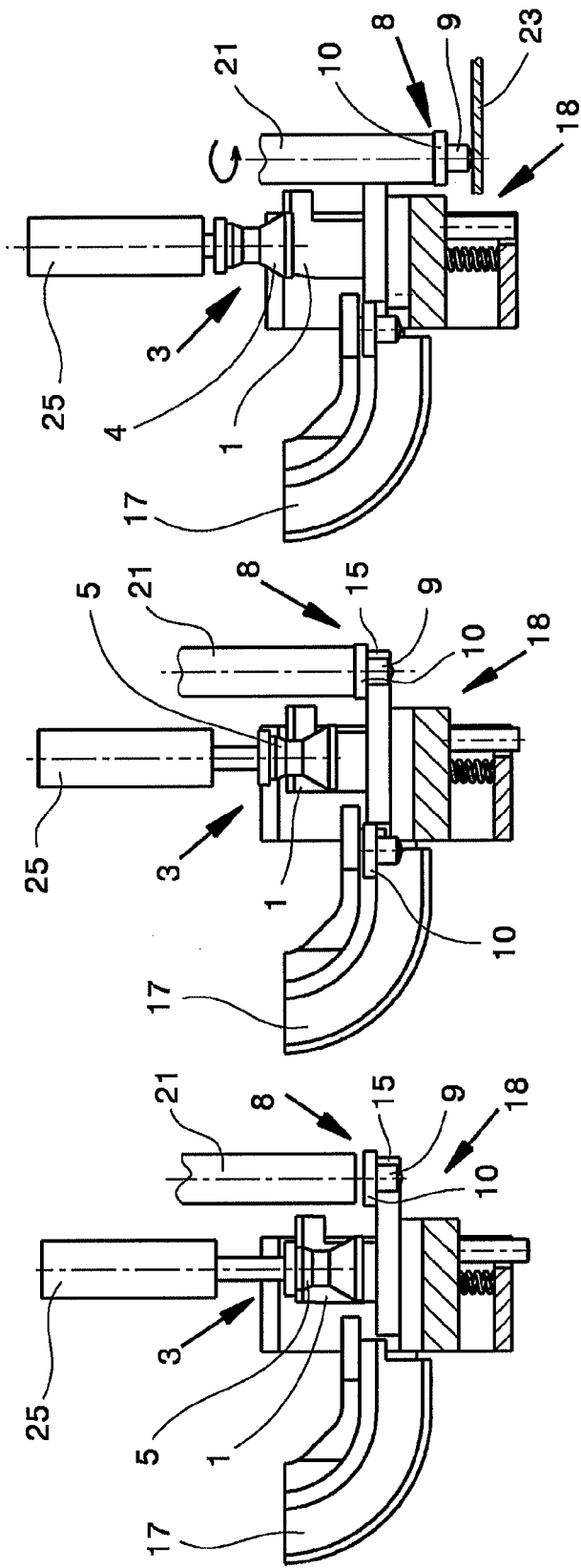

DEVICE FOR POSITIONING AND SUPPLYING FIXING ELEMENTS

The invention relates to a device for supplying and positioning fixing elements, comprising a chuck that is provided with two spring-loaded stopper parts and that holds one fixing element respectively for further processing.

A device of this kind is disclosed in German published patent application DE 10 2004 039 398 A1. This prior art device is used to supply—via a supply line—fixing elements intended for a friction-welded connection and having a substantially defined round cross-section to a receiving position where a chuck is provided. In this receiving position, each fixing element is then individually stopped by two spring-loaded stopper parts and moved to a waiting position in which it is then made to rotate by a pressure piece and pressed onto a component part for producing a friction-welded connection. In the chuck provided with the two stopper parts, the respective fixing element is only loosely held in an undefined position. This prior art device is thus only suitable for processing friction-welded parts, in particular friction-welded studs, which are only moved into the required position for proper processing in the final processing step.

It is the object of the invention to design the device in such a way that, as the fixing elements are being moved to their processing position, they are each guided in a precisely aligned state and pre-separated for subsequent processing in a processing position which requires high accuracy. Moreover, the device is to be capable of processing fixing elements of different sizes.

As is known, a device for supplying and positioning fixing elements comprises a chuck that is provided with two spring-loaded stopper parts and that holds a fixing element for further processing.

According to the invention, this is accomplished in that the stopper parts of the device are designed as clamping jaws with which an actuation element is associated that reaches between these jaws and that is provided with a narrow section and two neighbouring extensions as well as an axial slide for axially moving said actuation element. The movement of the actuation element is used to open and close the chuck by forcing the clamping jaws apart. Opening the chuck will release the fixing element for subsequent processing in a friction-welding step.

In this case, if an extension of the actuation element is introduced into the space between the spring-loaded clamping jaws, said clamping jaws will be forced apart, thus opening the chuck. However, if the narrow section of the actuation element is disposed between the clamping jaws, then the clamping jaws will be pressed together by leg springs and thus hold a fixing element located between them. Consequently, the chuck may assume a receiving position, i.e. an opening position in which the fixing elements are received, a closing or engaging position in which they are held, and a processing position, i.e. an opening position in which the fixing elements are released for further processing.

Moreover, depending on the design of the extensions, the chuck can be adapted to receive fixing elements of different sizes, for which purpose the effective diameter can be set by the axial movement of the actuation element.

In order to ensure the required mobility of the actuation element in its axial direction, a translational drive is expediently provided for this purpose. Such a drive may comprise a rotary motor which will effect an axial movement of the actuation element via a transmission element. The transmission element may be provided in the form of a female part in combination with a threaded shank which functions as an axial slide and will cause an axial movement of the actuation element corresponding to the rotary motion of the female part. Alternatively, other translational drives may also be used, for example a linear motor or a step motor in combination with a ball screw.

The chuck itself may be used to pre-separate the supplied fixing elements. For this purpose, the chuck is advantageously mounted so as to be vertically and/or axially moveable.

Advantageously, this vertical movability may be accomplished in that the actuation element moves the chuck vertically against a spring-loaded support. Such spring-loaded support may be constituted by pressure springs that are provided underneath the chuck. This support resets the chuck to an axial and/or vertical upper end position. Downward movement of the actuation element on the one hand causes the clamping jaws to be forced apart and on the other hand moves the entire chuck downward, in particular against the force of the pressure springs. In an advantageous manner, this position allows a fixing element to be supplied to the chuck.

In an upward movement, by contrast, the clamping jaws will close, due to the fact that the narrow section of the actuation element is now between them, and thus hold the fixing element between them.

In any case, the upward movement of the actuation element will result in an axial movement of the actuation element relative to the clamping jaws.

The pressure springs provided underneath the chuck will cause the chuck to be moved upward by the upward motion of the actuation element and the resulting relief of the pressure springs. The upward motion of the chuck will prevent further fixing elements from being supplied to the chuck as the supply of fixing elements to the chuck depends on the vertical position of the chuck. For example, after the chuck has been slid downward, it is capable of receiving fixing elements, whereas when the chuck has been slid vertically upwards, it will be blocked from receiving fixing elements.

Moreover, the upward movement of the chuck can be used to supply a held fixing element to a drive unit, for example a drive bit, located above the chuck, for further processing. The drive unit is used to connect a fixing element with a base, in particular through a rotary movement of the former. A vertical movement of the drive unit is necessary to move the fixing element from the release position to a processing position on the base. Moving the fixing element to the drive unit through a vertical movement of the chuck will allow the fixing element to be temporarily located on the drive unit. This will ensure that the fixing element will be reliably held on the drive unit during a vertical and/or axial movement of the drive unit, even against gravity, and thus can be processed in a very precise manner.

The fact that the chuck travels the distance to be bridged between the receiving position of the fixing element and the drive unit is advantageous in that it will not be necessary to move the entire drive in order to bring the drive unit and the fixing element close together. As a result, throughput is improved considerably.

As soon as the fixing element has been temporarily mounted on the drive unit so as to fasten the fixing element to the drive unit during the vertical movement of the latter, moving the actuation element further upward allows the chuck to assume an open position and/or processing position. In this processing position, the clamping jaws can be forced apart to such an extent that the drive unit having the fixing element mounted on it can be made to pass between the clamping jaws. The fixing element can then be attached to a base, for example a metal sheet, at precisely the intended position.

After the fixing element has been attached as intended, the drive unit can be moved back to its starting position. As soon as the drive unit is no longer located between the open clamping jaws, the actuation element can be moved downward again to the receiving position where a new fixing element may then be supplied to it.

In this way, a single axial movement cycle of the actuation element may be used to both pre-separate the fixing elements and to supply them to the chuck in a simple and fast way. In addition, the same movement can be used to supply a fixing element to the drive unit.

Expediently, the transition between the narrow section and each extension of the actuation element extends in a substantially continuous and tapering manner. This ensures a uniform closing and opening movement of the clamping jaws and prevents the actuation element from getting caught between the clamping jaws.

For processing fixing elements whose shank terminates in a head, the device is expediently designed such that in a receiving position thereof, the head will abut on the clamping jaws and its shank will project between the clamping jaws.

The front ends of the clamping jaws preferably include claws. These claws are shaped such that, in an open position for receiving the fixing element, the shank can be made to pass between the clamping jaws, with the claws constituting a stop for the fixing element at the end of the clamping jaws, however. This will prevent the fixing element from sliding through the clamping jaws.

The preliminary mounting of the fixing element on the drive unit may be improved by means of a location means which cooperates with the drive unit. The location means may operate based on vacuum suction, mechanical clamping, by means of pressurized air or magnetically.

Mounting the fixing element is in particular accomplished through friction welding, i.e. a rotary movement of the fixing element during which it is simultaneously pressed onto a component part.

An embodiment of the invention is illustrated in the figures, of which:

FIG. 4a is a view of the processing device in a receiving position thereof similar to the view of FIG. 1;

FIG. 4b is a view of the processing device in an engaging position thereof similar to the view of FIG. 2; and FIG. 4c is a view of the processing device in a processing position thereof similar to the view of FIG. 3.

Figure 1A:
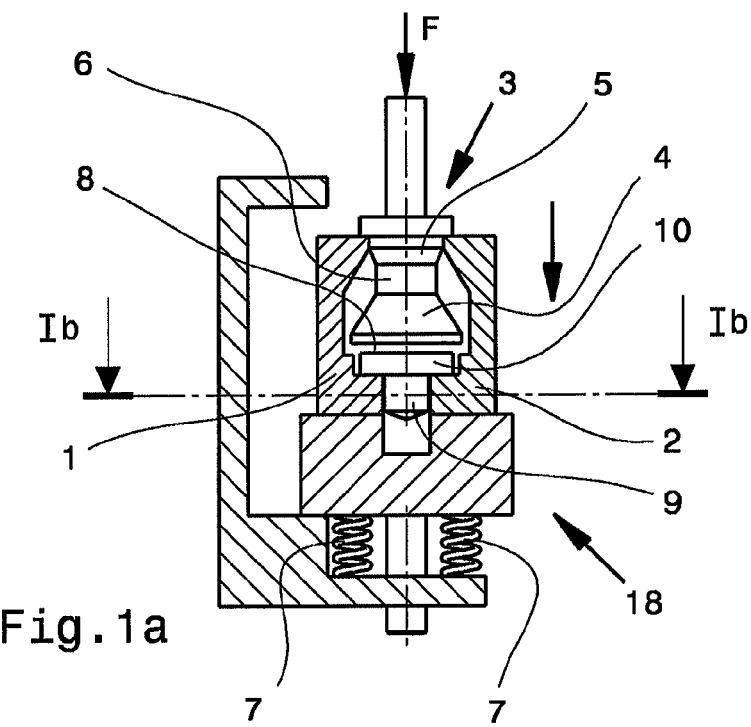
FIG. 1a is a sectional view through the chuck in a receiving position thereof for supplying a fixing element.

The chuck 18 for positioning fixing elements 8 as shown in the cross-sectional view of FIG. 1a has two clamping jaws 1 and 2 which can be laterally pivoted away from each other and are shown in an open position here in which the clamping jaws 1, 2 are spaced apart wide enough to receive a fixing element 8 between them. The maximum open position depends on the dimensions of the fixing elements 8 predominantly used as well as on the range to be covered.

The clamping jaws 1, 2 are basically opened by an axial movement of an actuation element 3 (see direction of arrow at its center line) and thus allow the introduction of a fixing element 8 with its head 10 and its shank 9.

At its bottom, the actuation element 3 has an extension 4 that is wider in diameter than the extension 5 provided at its opposite end, and the narrow section 6 is located between these extensions 4 and 5. The actuation element 3 is a rotationally symmetrical part which may be moved up and down by a lift mechanism which is not shown in FIG. 1a to keep the illustration simple.

The opening position of the clamping jaws 1 and 2 is obtained by moving the actuation element 3 downward in an axial direction thereof, and inserting the upper extension 5 between the clamping jaws 1, 2. This forces the clamping jaws 1, 2 apart and enables them to receive a fixing element 8 between them. The illustration of FIG. 1a shows the chuck 18 in a receiving position with the clamping jaws 1, 2 only partially open. In this receiving position, the actuation element 3 has its upper extension 5 between the clamping jaws 1, 2. The amount by which the jaws are forced apart in this position can be seen in FIG. 1b. The force axially exerted by the actuation element 3 on the clamping jaws 1, 2 and thus on the chuck 18 allows the entire chuck 18 to be moved vertically downwards. The ratio of the extent the jaws are forced apart and the vertical movement of the chuck 18 can be achieved through the stiffness of the leg springs 13, 14 and the bearing springs 7 of the chuck 18 as well as the slope of the extension 5. The transmission of force can also be accomplished by means of a stop which closes the upper extension 5.

Figure 1B:
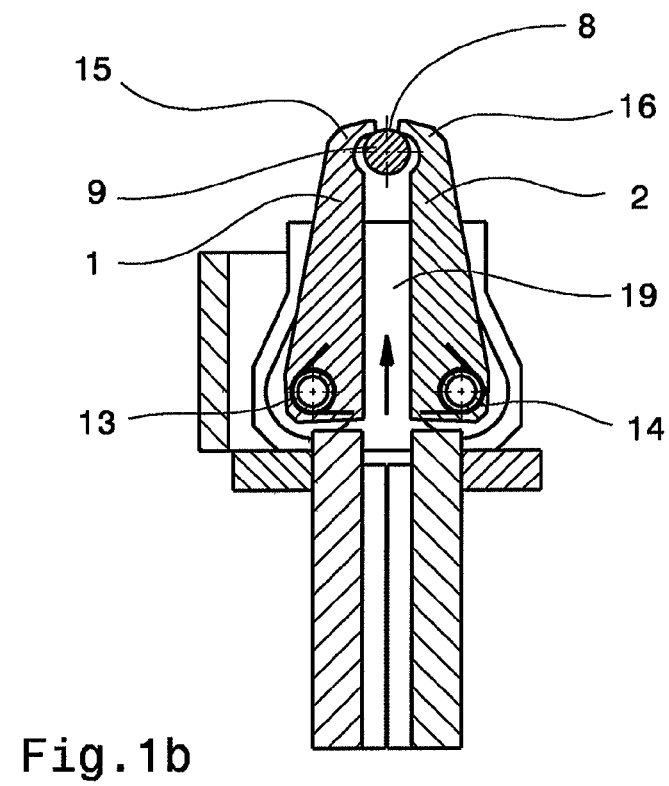
FIG. 1b is a sectional view thereof taken along lines Ib-Ib.

FIG. 1b is a sectional view of the component illustrated in FIG. 1a taken along lines Ib-Ib thereof, in which the component is in its receiving position for receiving fixing elements 8, with the actuation element 3 in the position shown in FIG. 1a. This position is particularly suited for horizontally supplying fixing elements 8. The clamping jaws 1, 2 are in an almost parallel position in which they essentially form a passage 19 for a fixing element 8 and/or its shank 9. Within this passage 19, the fixing element 8 is guided in the direction of the arrow. In this position, claws 15, 16 provided at the ends of the clamping jaws 1, 2 limit the movement of the fixing elements 8 in the direction of the arrow, thus ensuring the fixing element 8 to be reliably held and caught in an engaging position thereof. The two clamping jaws 1 and 2 are forced toward each other by the leg springs 13 schematically shown in FIG. 1b, thus pressing radially, on the fixing element 8 guided between them. The resulting angle of spread thus directly depends on the effective diameter of the actuation element 3 extending between the clamping jaws 1, 2.

Figure 2A:
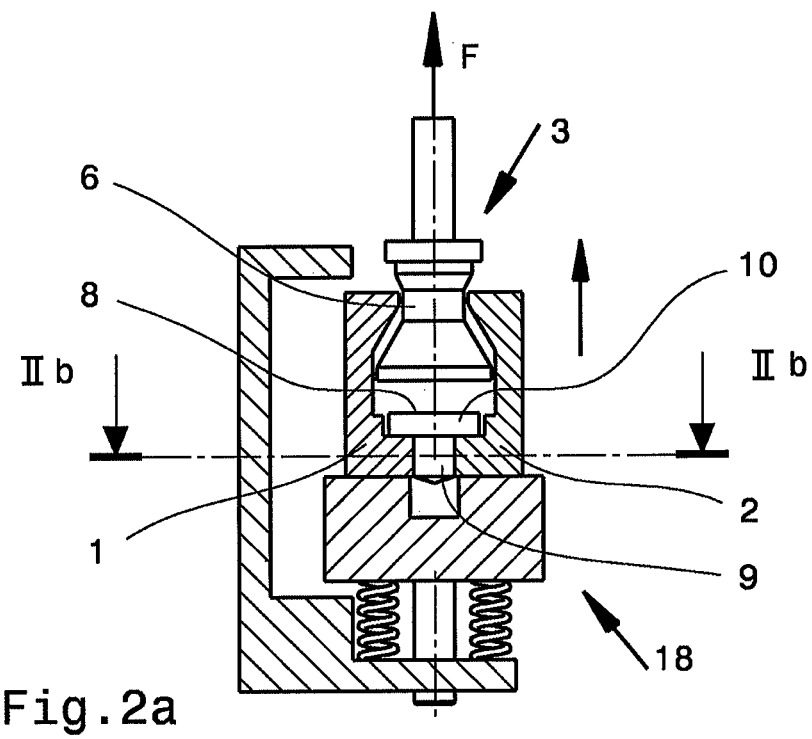
FIG. 2a is a view of the same chuck in a receiving position thereof with the fixing element clamped therein.
Figure 2B:
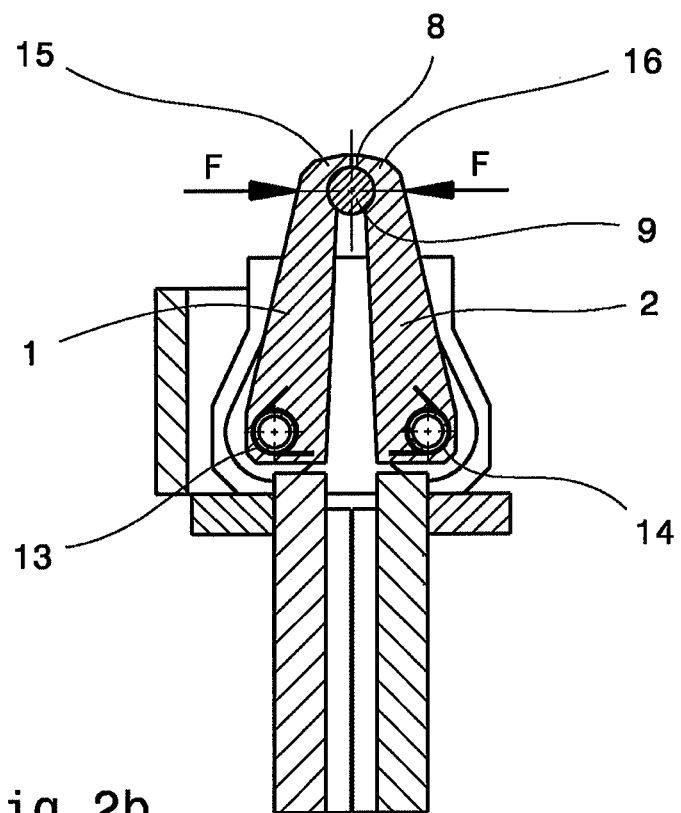
FIG. 2b is a sectional view thereof taken along lines IIb-IIb.

The sectional views of FIGS. 2a and 2b show the same arrangement as FIG. 1a and FIG. 1b but in a position in which the actuation element 3 protrudes further in a vertical direction from between the two clamping jaws 1 and 2. The two clamping jaws 1 and 2 here engage the narrow section 6 which results in them being closer together in the region of their claws 15 and 16, as is shown in FIG. 2b. The narrow section 6 allows the clamping jaws 1, 2 to be brought together and to thus hold a fixing element 8 which is guided between them along its shank 9. The fixing element 8 thus held may now be supplied to a drive unit. In this working step the fixing element 8 is moved vertically to a drive unit. This vertical movement is illustrated in more detail in FIGS. 4a to 4c.

Figure 3A:
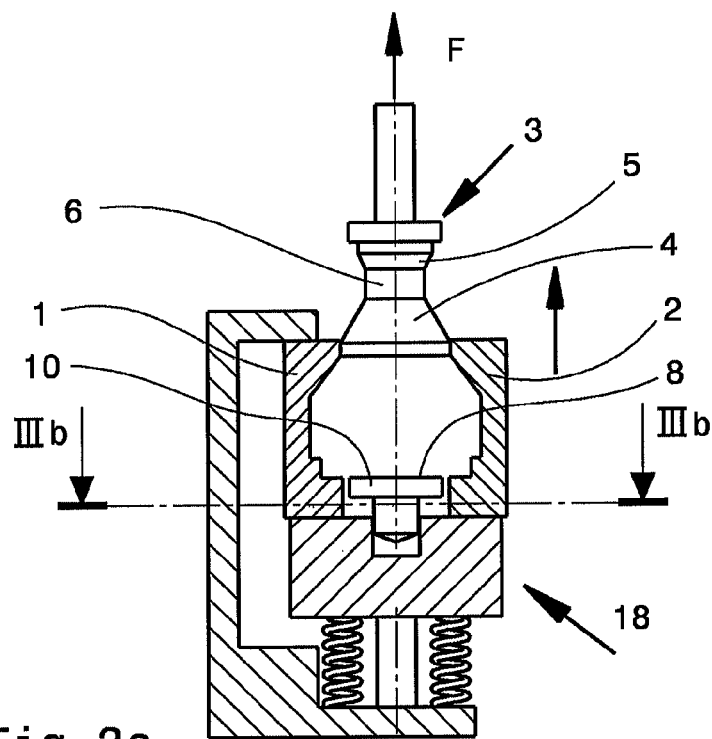
FIG. 3a is a view of the chuck in a processing position thereof for further processing a fixing element.
Figure 3B:
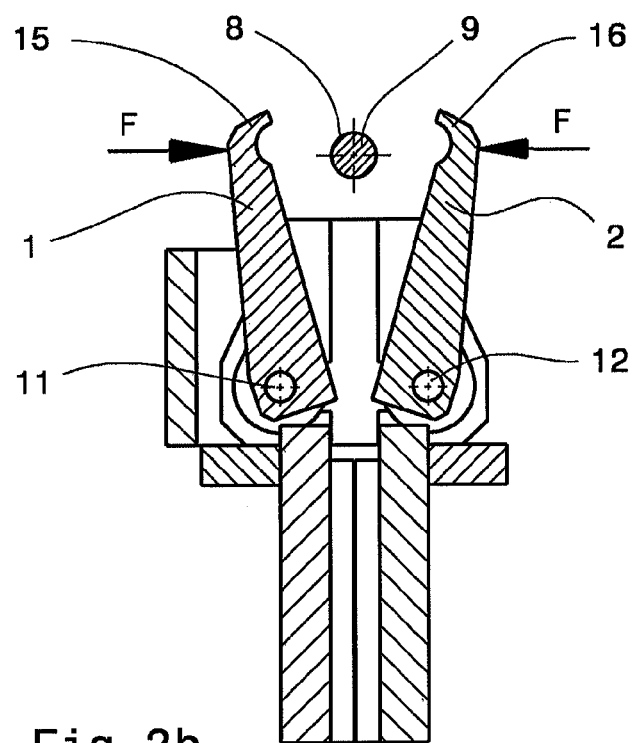
FIG. 3b is a sectional view thereof taken along lines IIIb-IIIb.

FIGS. 3a and 3b show another processing step of the fixing element 8 in which the shank 9 has been released from its clamped position, as is shown in FIG. 3b. In the position of the clamping jaws 1 and 2 shown in FIG. 3b the actuation element 3 can be moved axially in such a way that the fixing element 8 held by the two claws 15 and 16 is then released. For this purpose, the clamping jaws 1, 2 are forced apart by the lower extension 4 of the actuation element 3. A previously grabbed fixing element 8 will thus be released and can be processed further. The large diameter of the lower extension 4 will cause the clamping jaws 1, 2 to be forced apart to such an extent in the processing position that the shank 9 is released from its clamped state and, furthermore, that a drive unit can be moved between the clamping jaws 1, 2.

FIG. 3a is a sectional view taken along lines IIIb-IIIb of FIG. 3b in which the two clamping jaws 1 and 2 can each be rotated about shafts 11 and 12. It can be very clearly seen from this view that the fixing element 8 has now been released for further processing.

FIGS. 4a to 4c are schematic illustrations of a processing device, in a lateral sectional view thereof, in the individual operating states of the receiving position (FIG. 4a), the engaging position (FIG. 4b) and the processing position (FIG. 4c). The processing device is equipped with a supply means 17 for fixing elements 8. The fixing elements 8 include a head 10 each. The fixing elements 8 are transported pneumatically to the chuck 18. For reliably guiding the fixing elements 8 supplied by the supply means 17 to the processing position below a rotary shaft 21 using the mechanism described in more detail hereinafter, use is made of the mechanism of the clamping jaws 1, 2. In this embodiment, the actuation element 3 is moved up and down by a step motor 25 basically via an axial slide rod. In order to reach the receiving position, the actuation element 3 is moved downwards.

For receiving a fixing element 8, the entire chuck 18 is moved vertically downwards by the actuation element 3 (see FIG. 1a, 1b). The actuation element 3 is placed in a position in which part of its upper extension 5 reaches between the clamping jaws 1 and 2. In this position, a gap is left between the clamping jaws 1, 2 which extends relatively uniformly along their lengths. This gap can be used to guide the shank 9 of a fixing element 8 as it moves forward until it reaches the final position between the ends of the clamping jaws 1, 2 at the claws 15 and 16 where it can then be temporarily held for further processing.

In this state, as can be seen in FIG. 4a, the head 10 of the fixing element 8 can slide above and along the clamping jaws 1, 2. In this receiving position, the fixing element 8 is moved to the end of the clamping jaws 1, 2 to below the rotary shaft 21. As is clear from this view, the head 10 of the supplied fixing element 8 is vertically spaced from the rotary shaft 21.

In the next step, as shown in FIG. 4b, the fixing element 8 is clamped between the clamping jaws 1, 2. In order to move it from the receiving position to the engaging position, the actuation element 3 is moved upward to such an extent that the shank 9 of the fixing element 8 will be clamped between the clamping jaws 1, 2.

The end of the rotary shaft 21 which faces the fixing element 8 is provided with locating means which are capable of holding the head 10 of the fixing element 8 until the latter has been processed.

In the engaging position the chuck 18 firmly holds the fixing element 8 at its right end (see FIGS. 2a and b).

In order to increase the efficiency of the locating means, the fixing element 8 held between the claws 15, 16 of the clamping jaws 1, 2 is vertically moved by the chuck 18 toward the rotary shaft 21 where it is led to a position in the immediate vicinity of the locating means of the rotary shaft 21. This vertical movement of the chuck 18 in the direction of the rotary shaft 21 by the spring occurs simultaneously with the clamping of the fixing element 8 during the upward movement of the actuation element 3. By relieving the spring by moving the actuation element 3 upwards, the chuck 18 will be moved upward by the spring force until the upward movement of the chuck 18 is limited by the rotary shaft 21. The actuation element 3 will be moved to such an extent that only its narrow section 6 will be positioned between the clamping jaws 1, 2.

Moving the chuck 18 upward relative to the supply device 17 will prevent further fixing elements 8 from entering the chuck 18 in this operating state since their heads 10 will no longer be above the clamping jaws 1, 2 but rather at the same level and will thus be blocked by them. This ensures a pre-separation.

The locating device situated at the end of the rotary axis 21 facing the fixing element 8 is a suction opening which is used to suck the head 10 of the fixing element 8 to the rotary shaft 21. However, it may also be a mechanical claw locking means. After the fixing element 8 has been supplied to the locating device by the chuck 18, the locating device can operate in a simple manner so as to connect the fixing element 8 preliminarily with the rotary shaft 21.

FIG. 4c shows the processing device in the processing position of the chuck 18 for as soon as the fixing element 8 is held on the locating device of the rotary shaft 21, the fixing element 8 will be released by the chuck 18 (see FIGS. 3a and b), whereupon a schematically shown drive mechanism furthermore starts operating. This mechanism is a drive motor which drives a rotary shaft 21 that simultaneously presses onto the fixing element 8 which has been released from the chuck 18 in the position shown in FIG. 3b. The fixing element 8 will subsequently be pressed against the component 23 and connected with it by means of friction-welding.

For this purpose, the actuation element 3 as shown in FIG. 3a is moved completely to the top thus causing the clamping jaws 1, 2 to be forced apart by the lower extension 4 to such an extent that both the fixing element 8 and the rotary driving shaft 21 can be moved through the forced-apart clamping jaws 1, 2 in the direction of the component 23. The rotary shaft 21 connects the fixing element 8 with the component 23, as already described.

After connecting the fixing element 8 with the component 23, the temporary location by the locating device is released and the rotary shaft 21 moves back to its starting position above the chuck 18 again. The subsequent downward movement of the actuation element 3 starts the process for receiving and processing another fixing element 8 again.

This device can be used to sequentially perform this particular friction welding process in different places of the component 23, in which case new fixing elements 8 are respectively supplied, processed and welded to the underlying component 23. Supplying the fixing elements 8 in this way ensures fast and reliable processing of the fixing elements 8.

The invention claimed is:
1. A device for supplying and positioning fixing elements, which comprises: a chuck provided with two spring-loaded stopper parts for holding one fixing element at a time for further processing, the stopper parts being designed as clamping jaws which are mounted about a pivot axis on the chuck, an actuation element operatively associated with the clamping jaws and adapted to extend therebetween in an axial direction thereof, said actuating element provided with a narrow section and two adjacent extensions as well as an axial slide for axially moving said actuation element which is used to open and close the chuck by forcing the clamping jaws apart release the fixing element for subsequent processing when the chuck opens, wherein the chuck is mounted to be axially movable in parallel to the pivot axis of the clamping jaws by the actuation element.

2. The device of claim 1, wherein a translational drive is connected with the actuation element for axially moving the actuating element.

3. The device of claim 2, wherein the chuck is mounted to be axially movable.

4. The device of claim 2, wherein the transition between the narrow section and the extensions of the actuation element is defined by a continuous taper.

5. The device of claim 2, for processing fixing elements having a shank that terminates in a head wherein the fixing element is supplied to the chuck in a receiving position where the head abuts the clamping jaws which extend in parallel in the receiving position and the shank projects between the clamping jaws.

6. The device of claim 1, wherein the chuck is mounted so as to be axially movable.

7. The device of claim 6, wherein the chuck is mounted by means of bearing springs.

8. The device of claim 7, wherein the bearing springs hold the chuck in an axial upper position thereof.

9. The device of claim 8, wherein the chuck is axially moved by operable association with the actuation element.

10. The device of claim 8, wherein the transition between the narrow section and the extensions of the actuation element is defined by a continuous taper.

11. The device of claim 7, wherein the chuck is axially moved by operable association with the actuation element.

12. The device of claim 7, wherein the transition between the narrow section and the extensions of the actuation element is defined by a continuous taper.

13. The device of claim 7, wherein the supply of fixing elements to the gripping fingers is determined by the vertical position of the chuck in operable association with the actuation element.

14. The device of claim 6, wherein the chuck is axially movable by the actuation element.

15. The device of claim 14, wherein the transition between the narrow section and the extensions of the actuation element is defined by a continuous taper.

16. The device of claim 6, wherein the transition between the narrow section and the extensions of the actuation element is defined by a continuous taper.

17. The device of claim 6, for processing fixing elements having a shank that terminates in a head wherein a fixing element is supplied to the chuck in a receiving position where the head abuts the clamping jaws which extend in parallel in the receiving position and the shank projects between the clamping jaws.

18. The device of claim 1, wherein the transition between the narrow section and the extensions of the actuation element Is defined by a continuous taper.

19. The device of claim 1 for processing fixing elements having a shank that terminates in a head, wherein the fixing element is supplied to the chuck in a receiving position where the head abuts the clamping jaws which extend in parallel in the receiving position and the shank projects between the clamping jaws.

20. The device of claim 1, wherein because the actuating element moves parallel to the pivot axis of the clamping jaws, the clamping jaws are maintained within the same plane during the opening and closing of the clamping jaws, whereby the fixing elements are moved to subsequent processing in a precisely aligned state.

21. The device of claim 1, wherein the adjacent extensions represent sections which extend in a gradually increasing dimension relative to the narrow section disposed therebetween.

* * * * *